(No Model.)
W. E. HARRIS.
MACHINE FOR AMALGAMATING THE GOLD AND SILVER IN PULVERIZED ORES.
No. 282,982. Patented Aug. 14, 1883.
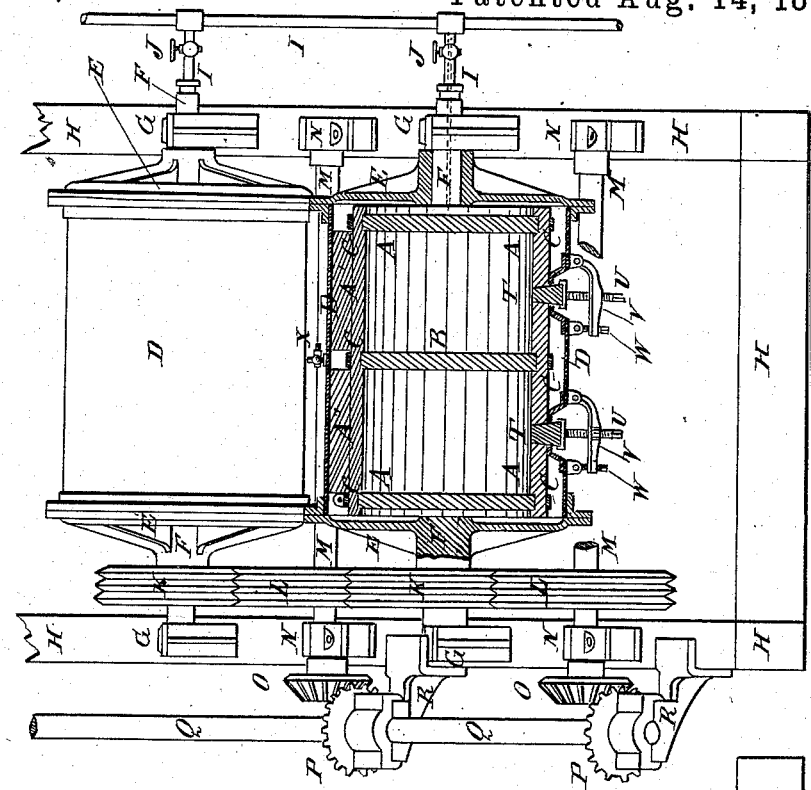
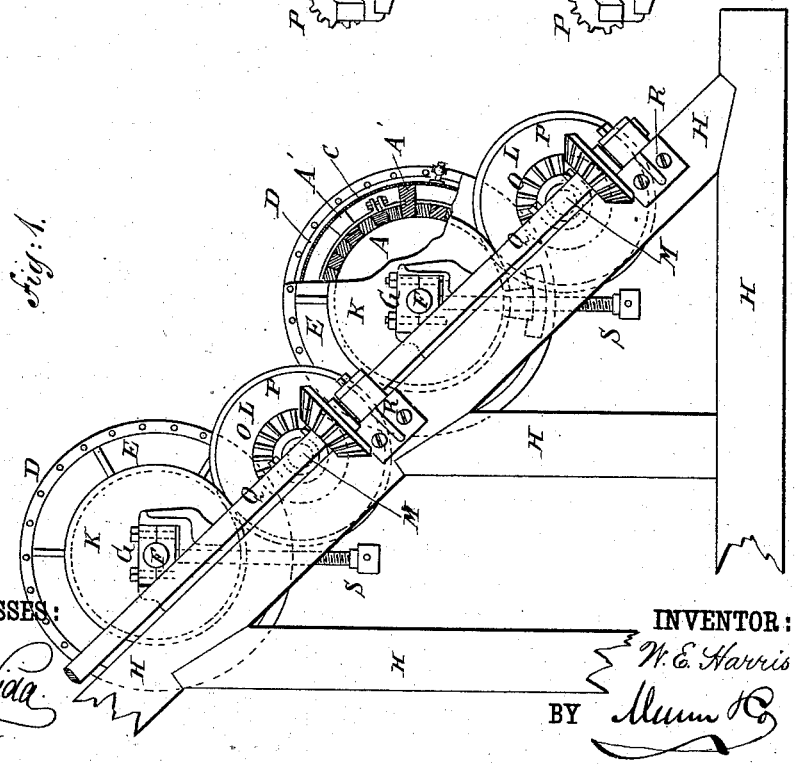
WITNESSES:
Chas. Nida
C. Sedgwick
INVENTOR:
W. E. Harris
BY Munn &Co.
ATTORNEYS.

UNITED STATES PATENT OFFICE.

WILLIAM E. HARRIS, OF NEW YORK, N. Y.

MACHINE FOR AMALGAMATING THE GOLD AND SILVER IN PULVERIZED ORES.

SPECIFICATION forming part of Letters Patent No. 282,982, dated August 14, 1883.

Application filed November 7, 1882. (No model.)

*To all whom it may concern:*

Be it known that I, WILLIAM EDWARD HARRIS, of the city, county, and State of New York, have invented an Improved Machine for Amalgamating the Gold and Silver in Pulverized Ores, of which the following is a full, clear, and exact description.

Reference is to be had to the accompanying drawings, forming a part of this specification, in which similar letters of reference indicate corresponding parts in both figures.

Figure 1 is a side elevation of my improvement, part being broken away, and Fig. 2 is a front elevation of the same, partly in section, through one of the cylinders.

The object of this invention is to provide a mechanism by the use of which pulverized gold and silver ores can be heated and thoroughly mixed with bromine or bromide of sodium and the bromidized ore treated with quicksilver, while preventing the bromine or bromide of sodium from coming in contact with and acting upon any other metal during the operation.

In the drawings, A represents a wooden cylinder of suitable size, which is divided into two compartments by a central partition, B, and which is formed of staves bound together by iron hoops C. Several of the staves of the cylinder A are made thicker than the others, as shown at A' in Figs. 1 and 2, to center and support the said wooden cylinder within a sheet-iron cylinder, D. The projecting parts of the thicker staves, A', of the cylinder A are slotted transversely to receive the hoops C and allow the said hoops to come in contact with and fit upon the thinner staves, which slots form channels of communication between the compartments formed by the projecting parts of the said staves.

The ends of the sheet-iron casing are closed by cast-iron heads E, provided with gudgeons F, which revolve in bearings G, attached to a suitable frame, H. The gudgeon F at one end of the cylinder is made hollow, and with it is connected, by a stuffing-box or other suitable steam-tight connection, a steam-pipe, I, which is provided with a valve, J, to allow the steam to be admitted and shut off, as may be required.

To the solid gudgeon F at the other end of the cylinder is attached a friction-pulley, K, the face of which is provided with V-shaped annular grooves to engage with the similarly-grooved face of a friction-pulley, L, attached to a shaft, M. The shaft M revolves in bearings N, attached to the frame H, and to its end is attached a beveled gear-wheel, O, the teeth of which mesh into the teeth of a beveled gear-wheel, P, attached to the driving-shaft Q. The shaft Q revolves in bearings in brackets R, attached to the frame H, and can be driven from any convenient power.

The bearings G are provided with hand-screws S, by means of which the said bearings G can be raised to throw the pulleys K out of gear with the pulleys L when required.

In the side of the cylinder A are formed two circular openings, leading into the two compartments of the said cylinder, and which are closed by wooden plugs T. Access to the openings in the cylinder A is had through funnels placed in openings in the casing D and secured to the said casing D and to the cylinder A. The plugs T are locked in place by hand-screws U, which pass through screw-holes in the bars V. The bars V are hinged at one end to the casing D, and have eyes formed in their other ends to receive the screws W, hinged to the casing D at the other side of the openings in the casing D, so that the plugs T can be firmly locked in place, and can be readily removed when required for the admission and removal of the ore being treated.

Any desired number of cylinders can be used in a series, and all can be driven from the same shaft Q and connected with the same steam-pipe I.

In using the machine, pulverized ore and heated water are introduced into the wooden cylinder in about the proportion of three hundred pounds of water to a ton of ore, which reduces the ore to about the consistency of soft mortar. When the cylinder is about seven-eighths full, two pounds of bromine or bromide of sodium for each ton of ore is added, and steam is admitted into the space between the wooden cylinder and the iron casing to keep the contents of the wooden cylinder hot, and thus increase the action of the bromine or bromide of sodium upon the gold and silver in the ore. The cylinder is revolved for two or three hours until all the gold and silver in the ore is thoroughly bromidized, so that it will readily amalgamate with quicksilver. A suitable quantity of quicksilver is then introduced into the cylinder, and the revolution of the cylinder is continued for two or three hours, after which the contents of the cylinder can be discharged and treated in the ordinary manner to separate the amalgam from the ore. The water of condensation can be withdrawn from the space between the wooden cylinder A and the casing D through a stop-cock, X, connected with the said casing.

Having thus described my invention, I claim as new, and desire to secure by Letters Patent—

1. In an apparatus for bromidizing and amalgamating gold and silver in pulverized ores, the rotary cylinder A, formed of longitudinal wooden staves held together upon two wooden end heads and a middle wooden head or partition by hoops C directly over said heads, whereby said staves will be held securely together on the line of their joints, and the bromine, bromide of sodium, or quicksilver be prevented from contact with any metallic substance except that in the ores, as described.

2. An amalgamating-cylinder having transversely-slotted staves A′ arranged at intervals and placed at a uniform elevation above the others, in combination with a surrounding cylder, D, resting on said staves A′, extended at each end to leave an open space between the ends of the two cylinders, and provided with a hollow trunnion, F, adapted to connect with a steam-supply, whereby are formed between the staves A′ chambers connecting with each other and with the end chambers, as shown, in order to form a steam-jacket around the joints of the inner cylinder and prevent any diminution of heat inside by escape through said joints.

WILLIAM EDWARD HARRIS.

Witnesses:
M. DUMFORD,
GEORGE LIGHT.